United States Patent
Iwasaki et al.

(10) Patent No.: US 8,516,297 B2
(45) Date of Patent: *Aug. 20, 2013

(54) RECOVERY FROM MEDIUM ERROR ON TAPE ON WHICH DATA AND METADATA ARE TO BE STORED BY USING MEDIUM TO MEDIUM DATA COPY

(75) Inventors: Norie Iwasaki, Kanagawa (JP); David Michael Morton, Tucson, AZ (US); Yun Mou, Tucson, AZ (US); Laura Jean Ostasiewski, Austin, TX (US); Takeshi Sohda, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/482,712

(22) Filed: May 29, 2012

(65) Prior Publication Data

US 2012/0239967 A1 Sep. 20, 2012

Related U.S. Application Data

(63) Continuation of application No. 12/782,510, filed on May 18, 2010, now Pat. No. 8,255,738.

(51) Int. Cl.
*G06F 11/00* (2006.01)

(52) U.S. Cl.
USPC .............................. 714/6.1; 714/32; 711/114

(58) Field of Classification Search
USPC ............................ 714/6.1, 30, 6.32; 711/114
See application file for complete search history.

(56) References Cited

U.S. PATENT DOCUMENTS

| | | | |
|---|---|---|---|
| 5,911,148 A | 6/1999 | Anglin et al. | |
| 6,434,682 B1 | 8/2002 | Ashton et al. | |
| 6,477,591 B1 | 11/2002 | VanderSpek et al. | |
| 6,477,628 B1 | 11/2002 | Bish et al. | |
| 6,628,591 B1 | 9/2003 | Yokota et al. | |
| 6,675,177 B1 * | 1/2004 | Webb | 1/1 |
| 7,103,731 B2 | 9/2006 | Gibble et al. | |
| 7,218,468 B2 | 5/2007 | Jauette et al. | |
| 7,353,432 B1 | 4/2008 | Talagala et al. | |
| 7,454,406 B2 * | 11/2008 | Kaplan et al. | 1/1 |

(Continued)

OTHER PUBLICATIONS

G. Sharples, "Recovery: A Computer Program to Restore Files From Dump Tapes Produced by GEORGE 3 Operating System", CSA Technology Research Database, 1973, abstract, Report No. RAE-TM-MATH-7307; BR39563; Pagination 39P.

(Continued)

*Primary Examiner* — Loan L. T. Truong
(74) *Attorney, Agent, or Firm* — Rabindranath Dutta; Konrad Raynes Davda & Victor LLP (57) ABSTRACT

A copy export application implemented in a computational device receives a request to perform a copy export operation of data and metadata to a selected tape in a tape library coupled to the computational device. The copy export application copies the data from the computational device to the selected tape. The copy export application determines a medium error on the selected tape while copying the metadata from the computational device to the selected tape, subsequent to completion of the copying of the data from the computational device to the selected tape. The copy export application sends a request to a tape control application to replace the selected tape by a new tape and copy the data from the selected tape to the new tape. The copy export application copies the metadata to the new tape.

20 Claims, 5 Drawing Sheets

(56) References Cited

U.S. PATENT DOCUMENTS

| | | |
|---|---|---|
| 7,529,745 B2 * | 5/2009 | Ahluwalia et al. ................... 1/1 |
| 7,620,765 B1 | 11/2009 | Ohr et al. |
| 7,673,169 B1 | 3/2010 | Kumaresan et al. |
| 7,793,041 B2 * | 9/2010 | Jaquette et al. ............... 711/111 |
| 7,814,071 B2 | 10/2010 | Van Patten Benhase et al. |
| 8,117,501 B2 * | 2/2012 | Taniyama et al. ............... 714/42 |
| 2002/0103982 A1 | 8/2002 | Ballard et al. |
| 2002/0174139 A1 * | 11/2002 | Midgley et al. ............... 707/204 |
| 2004/0054699 A1 * | 3/2004 | Bear et al. ..................... 707/204 |
| 2004/0123032 A1 * | 6/2004 | Talagala et al. ............... 711/114 |
| 2004/0255091 A1 | 12/2004 | Justo et al. |
| 2005/0013035 A1 * | 1/2005 | Crighton et al. ................ 360/69 |
| 2005/0138526 A1 | 6/2005 | Stouffer et al. |
| 2006/0085595 A1 | 4/2006 | Slater |
| 2006/0126211 A1 | 6/2006 | Sasaki |
| 2006/0253766 A1 * | 11/2006 | Winarski et al. ............... 714/755 |
| 2006/0271818 A1 * | 11/2006 | Chien ............................ 714/13 |
| 2007/0041117 A1 * | 2/2007 | Saliba ............................ 360/53 |
| 2007/0050686 A1 * | 3/2007 | Keeton et al. .................. 714/48 |
| 2008/0091894 A1 * | 4/2008 | Retnamma et al. ........... 711/161 |
| 2008/0168108 A1 * | 7/2008 | Molaro et al. ................. 707/202 |
| 2008/0198489 A1 * | 8/2008 | Ballard et al. .................. 360/31 |
| 2008/0222344 A1 * | 9/2008 | Upadhyayula ................... 711/4 |
| 2008/0243769 A1 | 10/2008 | Arbour et al. |
| 2009/0006733 A1 * | 1/2009 | Gold et al. ..................... 711/111 |
| 2009/0043830 A1 | 2/2009 | Lu et al. |
| 2009/0100223 A1 | 4/2009 | Murayama et al. |
| 2009/0132775 A1 | 5/2009 | Otani et al. |
| 2009/0198650 A1 | 8/2009 | Sims et al. |
| 2009/0271412 A1 | 10/2009 | Lacapra et al. |
| 2009/0282203 A1 | 11/2009 | Haustein et al. |
| 2009/0327625 A1 * | 12/2009 | Jaquette et al. ............... 711/160 |
| 2010/0011239 A1 * | 1/2010 | Kawaguchi et al. ............ 714/6 |
| 2010/0153660 A1 * | 6/2010 | Lasser .......................... 711/154 |
| 2010/0182887 A1 | 7/2010 | Moody et al. |
| 2010/0265606 A1 | 10/2010 | Thompson et al. |
| 2010/0265807 A1 * | 10/2010 | Thompson et al. ........ 369/53.41 |
| 2010/0318812 A1 | 12/2010 | Audradkar et al. |
| 2010/0332990 A1 * | 12/2010 | Prahlad et al. ................ 715/735 |
| 2011/0149707 A1 * | 6/2011 | Ozeki et al. ..................... 369/84 |
| 2011/0185149 A1 * | 7/2011 | Gruhl et al. ................... 711/206 |
| 2011/0289347 A1 * | 11/2011 | Iwasaki et al. ................. 714/5.1 |

OTHER PUBLICATIONS

K.M. Chandy, et al., "Analytic Models for Rollback and Recovery Strategies in Database Systems", INSPEC, IEEE Transactions on Software Engineering, vol. SE-1, No. 1, Mar. 1975, pp. 100-110.

W.T. Ng, et al., "Integrating Reliable Memory in Databases", VLDB Journal, 1998, pp. 194-204.

K.M. Greenan, et al., "Reliability Mechanisms for File Systems Using Non-Volatile Memory as a Metadata Store", ACM, 2006, pp. 178-187.

\* cited by examiner

RECOVERY FROM MEDIUM ERROR ON TAPE ON WHICH DATA AND METADATA ARE TO BE STORED BY USING MEDIUM TO MEDIUM DATA COPY

CROSS REFERENCE TO RELATED APPLICATIONS

This application is a continuation of U.S. patent application Ser. No. 12/782,510, filed May 18, 2010, which application is incorporated herein by reference in its entirety.

BACKGROUND

1. Field

The disclosure relates to a method, a system, and a computer program product for recovery from medium error on tape on which data and metadata are to be stored by using a medium to medium data copy.

2. Background

In certain computing environments, a tape library may be coupled to a computational system, wherein the computational system may manage the tape library. The tape library may have a plurality of tape drives, wherein tapes may be removed and inserted into one or more of the plurality of tape drives.

Customer data may be written to the tapes inside the tape library. The computational system may provide a copy export operation that allows a copy of customer data to be removed and taken offsite for disaster recovery purposes. To ensure availability of full backup data in case of a potential disaster, customers may periodically execute copy export operations on the computational system, wherein in certain situations the periodic execution of the copy export operation may occur on a daily basis.

During a copy export operation, the computational system writes the metadata (e.g., the database for managing storage and the customer data) corresponding to the customer data at the end of each tape that is to be exported, so that later on at a disaster recovery computational system, the metadata may be fully restored with the customer data and the customer data is ready for use.

SUMMARY OF THE PREFERRED EMBODIMENTS

Provided are a method, a system, and a computer program in which a copy export application implemented in a computational device receives a request to perform a copy export operation of data and metadata to a selected tape in a tape library coupled to the computational device. The copy export application copies the data from the computational device to the selected tape. The copy export application determines a medium error on the selected tape while copying the metadata from the computational device to the selected tape, subsequent to completion of the copying of the data from the computational device to the selected tape. The copy export application sends a request to a tape control application to replace the selected tape by a new tape and copy the data from the selected tape to the new tape. The copy export application copies the metadata to the new tape.

In additional embodiments a tape control application implemented in the computational device receives the request from the copy export application, and performs a tape to tape move of the data from the selected tape to the new tape. The tape control application ejects the selected tape, replaces the selected tape with the new tape, and sends a volume serial number of the new tape to the copy export application.

In yet additional embodiments, the copy export application determines whether the volume serial number has been received within a predetermined amount of time, in response to sending the request to the tape control application to replace the selected tape by a new tape and copy the data from the selected tape to the new tape. The copy export application performs the copying of the metadata to the new tape, in response to determining that the volume serial number has been received within the predetermined amount of time.

In further embodiments, the copy export application indicates a failure of the copy export operation, in response to determining that the volume serial number has not been received within the predetermined amount of time.

In yet further embodiments, the data is customer data, wherein customer data is data that is specifically reserved to be used by a customer. The metadata is a database to manage the customer data. The copy export operation is successful only in response to both the customer data and the database being transferred from the computational device to a single tape, wherein the single tape is one of the selected tape and the new tape.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Delay in Exporting Data and Metadata into Tapes

It may not always be possible to accurately predict the actual available capacity on a selected tape, in order to ensure that there is enough storage space available on the tape to write metadata after the data has been written to the tape. The computational device may record the amount of data that is written to the selected tape on each successful write of customer data and calculate the available blank space on the tape by subtracting the total amount of data written from the selected tape's native capacity that is obtained from the medium specification of the selected tape. When the calculated available blank space is close to the size of current metadata, the computational device may stop writing additional customer data on the selected tape and start to write the metadata on the selected tape. However, if the portions of the tape are degraded, the actual capacity of the tape is less than the native capacity. This may result in an incorrect estimation of the available blank space and the computational device may be unable to append the full metadata because of the lack of space on the tape. If this happens, the copy export operation on this tape will fail because the tape does not have full metadata information. Customers may not export any data written on this tape unless the customers start another copy export operation to re-export the data, or perform a manual recovery by moving the data from the failed tape to a new tape.

In certain situations customers may initiate the execution of the copy export operation once a day. If a tape fails on this once a day copy export operation, the data may not be exported until the next copy export operation that occurs on the next day. If a manual recovery is performed by moving the data from the failed tape to a new tape, the customer may have to start another copy export operation to re-export the remaining data on the new tape The failed tape may also be used to recall all of customer data on the failed tape back into the computational device cache and migrate the customer data to a new tape. Since this data needs to be migrated to tape again following the regular data migration scheduling, exporting the data once again may require another copy export operation.

Timely Recovery on Tape Failure

In certain embodiments, when a medium error is encountered during metadata backup, the computational device may generate a notification for operator intervention to notify the customer that a medium error has been encountered and the failed tape with a given serial number will be ejected later on. The computational device may also start a tape-to-tape data copy (reclamation) to move all of the customer data from this failed tape to a new tape. At the end of successful reclamation, the computational device may append the metadata to the new tape. If the metadata backup is successful, the tape is ready for export.

In certain embodiments, the recovery is automated and does not require customer or field support to manually invoke a recovery. The automated recovery can be done in the same copy export operation when the failure occurs, so that the customer can get data exported on schedule. There is no need to re-run copy export on these data. During the recovery, customer data on the failed tape is moved to a new tape directly via tape to tape data copy, without being recalled back into the cache and having to wait to be migrated later on to a new tape from the cache. The degraded or bad tape may be ejected at the end of recovery automatically and a notification may be sent to the customer so that this tape is not used for copy export any more.

Exemplary Embodiments

Figure 1:
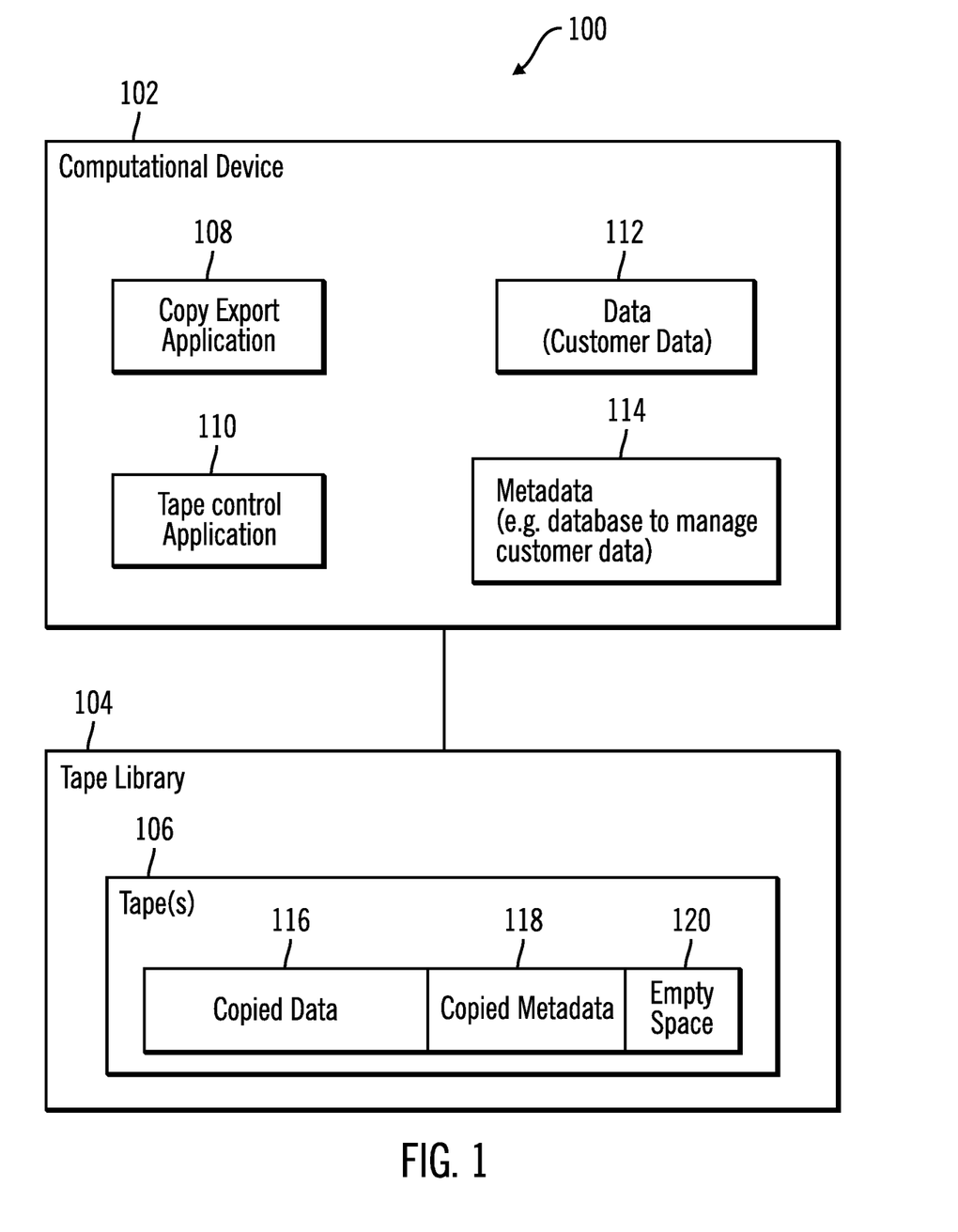
FIG. 1 illustrates a block diagram of a computing environment that includes a computational device coupled to a tape library in accordance with certain embodiments.

FIG. 1 illustrates a block diagram of a computing environment 100 that includes a computational device 102 coupled to a tape library 104 in accordance with certain embodiments. The computational device 102 may comprise any suitable computational device, including those presently known in the art, such as, a personal computer, a workstation, a server, a mainframe, a hand held computer, a palm top computer, a telephony device, a network appliance, a blade computer, a storage server, a storage controller, etc. The tape library 104 may comprise any suitable tape library known in the art. One or more tapes 106 may be present in the tape library 104.

The computational device 102 has a copy export application 108, a tape control application 110, data 112, and metadata 114. In certain embodiments, the data 112 is customer data, wherein customer data is data that is specifically reserved to be used by a customer. In certain embodiments, the metadata 114 is a database to manage the customer data.

The copy export application 108 performs a copy export operation, wherein the copy export is successful only in response to both the data 112 and the metadata 114 being transferred from the computational device to a single tape (i.e., only one tape) stored in the tape library 104. For example, in certain embodiments the data 112 is copied to the tape 106 (the copied data is shown via reference numeral 116 within the tape 106), and metadata 114 is copied to the tape 106 (the copied metadata is shown via reference numeral 118 within the tape 106). Empty space 120 may also be present in the tape 106 after the data 112 and the metadata 114 have been copied to the tape 106. The tape control application 110 is capable of ejecting a tape from the tape library 104 and for performing tape to tape move of data, wherein tape to tape move of data results in a movement of data from one tape to another. In alternative embodiments the data 112 may be split among a plurality of tapes, wherein each tape includes the metadata 114.

Figure 2:
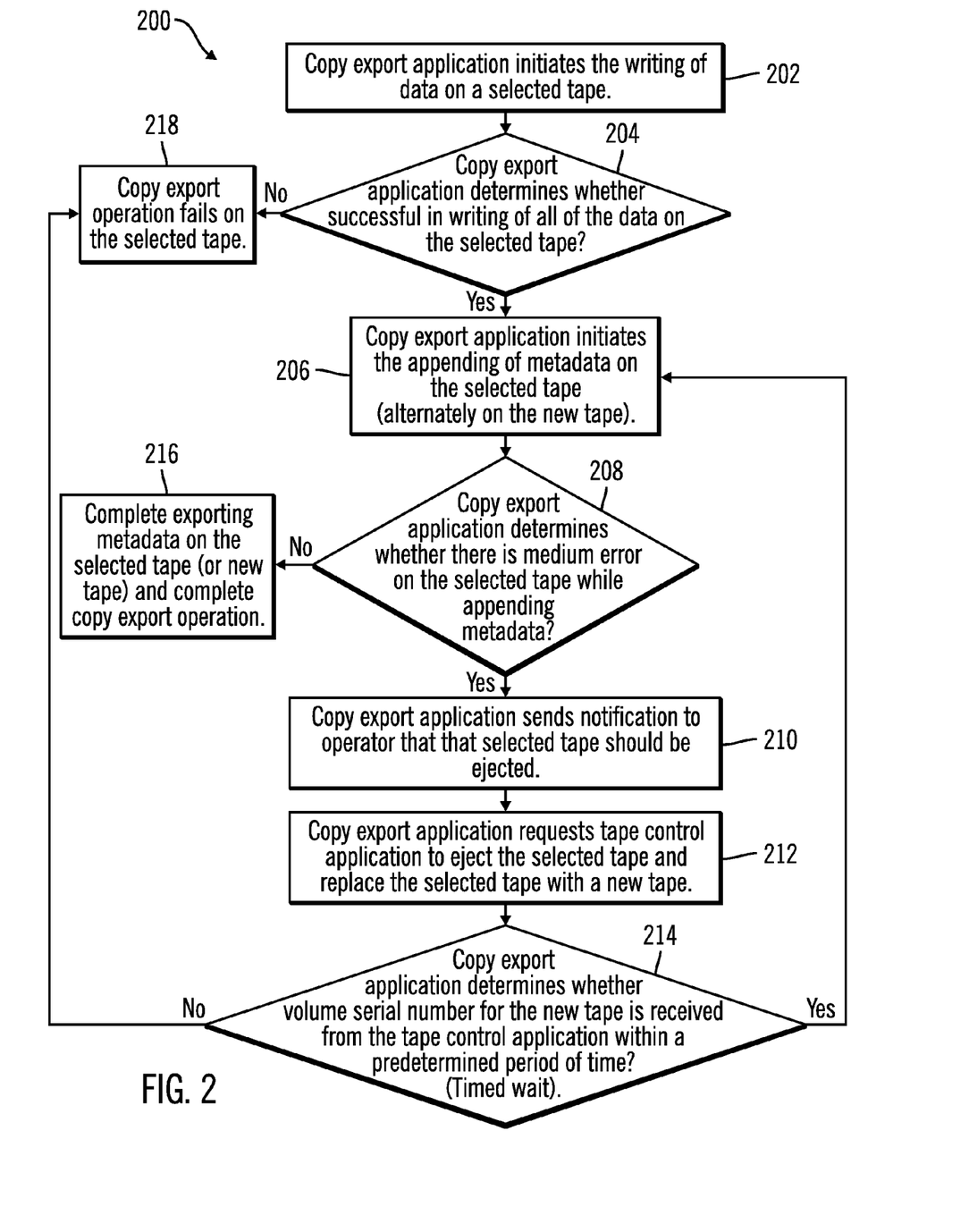
FIG. 2 illustrates a flowchart that shows first operations performed by a copy export application implemented in the computational device, in accordance with certain embodiments.

FIG. 2 illustrates a flowchart of first operations 200 performed by the copy export application 108 implemented in the computational device 102, in accordance with certain embodiments.

Control starts at block 202 in which the copy export application 108 initiates the writing of data 112 on a selected tape 106. Control proceeds to block 204 in which the copy export application 108 determines whether the writing of all of the data 112 on the selected tape 106 is successful. If so, control proceeds to block 206 in which the copy export application 108 initiates the appending of metadata 114 on the selected tape 106.

Control proceeds to block 208 in which the copy export application 108 determines whether there is a medium error on the selected tape while appending the metadata 114 on the selected tape 106, wherein a medium error may be caused as a result of inadequate empty space to write the metadata 114 and/or via degradation of the selected tape 106. If there is a medium error then the copy export application 108 sends (at block 210) a notification to an operator that the selected tape should be replaced and then proceeds to automatically request (at block 212) the tape control application 110 to eject the selected tape 106 and replace the selected tape 106 with a new tape.

Control proceeds to block 214 in which the copy export application 108 determines whether a volume serial number for the new tape is received from the tape control application 110 within a predetermined period of time (i.e., there is a timed wait by the copy export application 108). If the volume serial number of the new tape is received within the predetermined period of time then ("Yes" branch from block 214) the copy export application 208 again initiates the appending of the metadata but this time on the new tape (the data has already been transferred to the new tape by the tape control application 110 while replacing the selected tape with the new tape). If at block 208 there is no medium error ("No" branch from block 208, then the copy export application 108 completes (at block 216) the exporting of metadata on the new tape (or selected tape in certain iterations) and completes the copy export operations.

If at block 204, the copy export application 108 is unsuccessful ("No" branch from block 204) in writing all of the data on the selected tape then the copy export operation fails (at block 218) on the selected tape 106. The copy export operations also fails (at block 218) on the selected tape 106 if the volume serial number is not received ("No" branch from block 214) by the copy export 108 from the tape control application 110.

Therefore, FIG. 2 illustrates certain embodiments in which the copy export application 108 may cause the copying of both data 112 and metadata 114 on a selected tape or on new tape that replaces the selected tape, in response to a medium error while copying the metadata to the selected tape.

Figure 3:
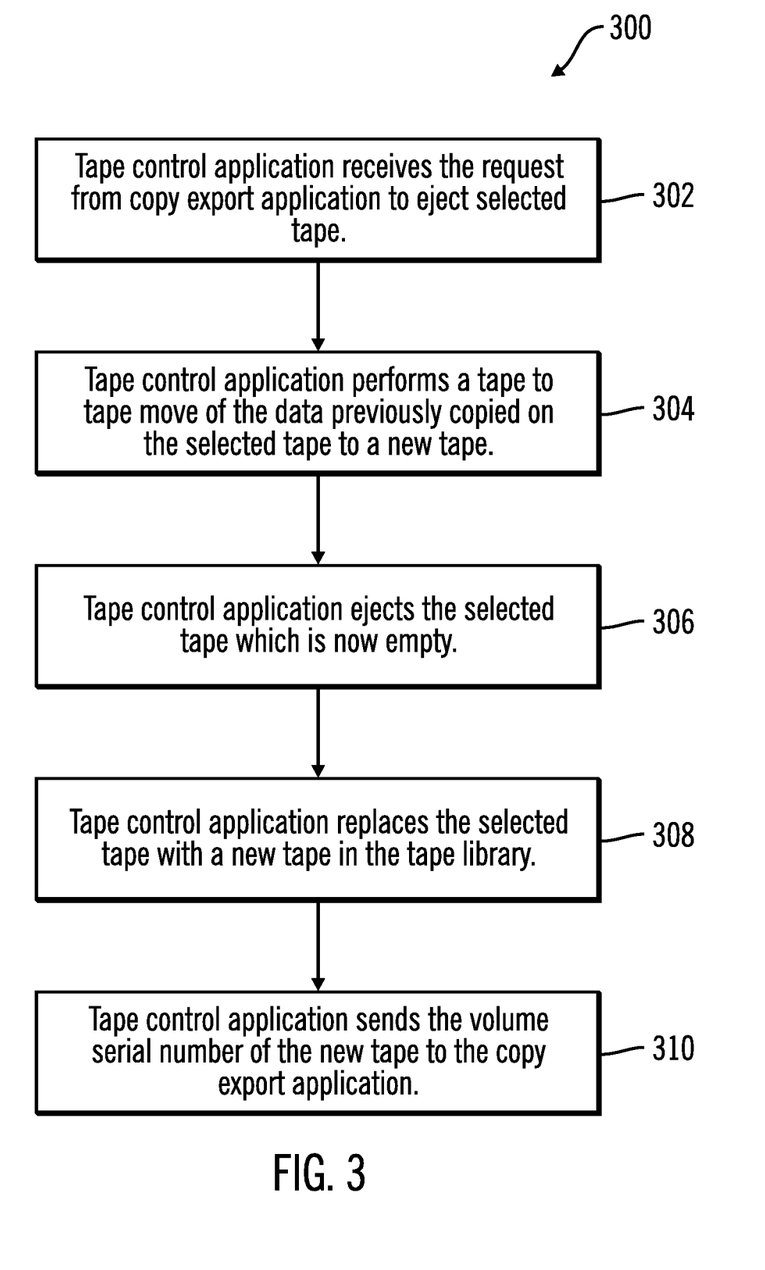
FIG. 3 illustrates a flowchart that shows second operations performed by a tape control application implemented in the computational device, in accordance with certain embodiments.

FIG. 3 illustrates a flowchart of second operations 300 performed by a tape control application 110 implemented in the computational device 102, in accordance with certain embodiments.

Control starts at block 302 in which the tape control application 110 receives a request from the copy export application 108 to eject a selected tape 106, wherein a medium error was generated while metadata was being written to the selected tape 106. The tape control application 110 performs (at block 304) a tape to tape move of the data previously copied on the selected tape 106 to a new tape.

Control proceeds to block 306 in which the tape control application 110 ejects the selected tape 106 which is now empty because the data of the selected tape 106 was moved to the new tape in block 304. The tape control application 110 replaces (at block 308) the selected tape 106 with a new tape in the tape library 104 and then sends (at block 310) the volume serial number of the new tape to the copy export application 108.

Therefore, FIG. 3 illustrates certain embodiments in which the tape control application 110 performs a tape to tape move of the data previously copied to a selected tape 106 to a new tape, wherein all the metadata corresponding to the data could not be copied to the selected tape 106 because of a medium error. The tape control application 110 sends the volume serial number of the new tape to the copy export application 108 after replacing the selected tape with the new tape.

Figure 4:
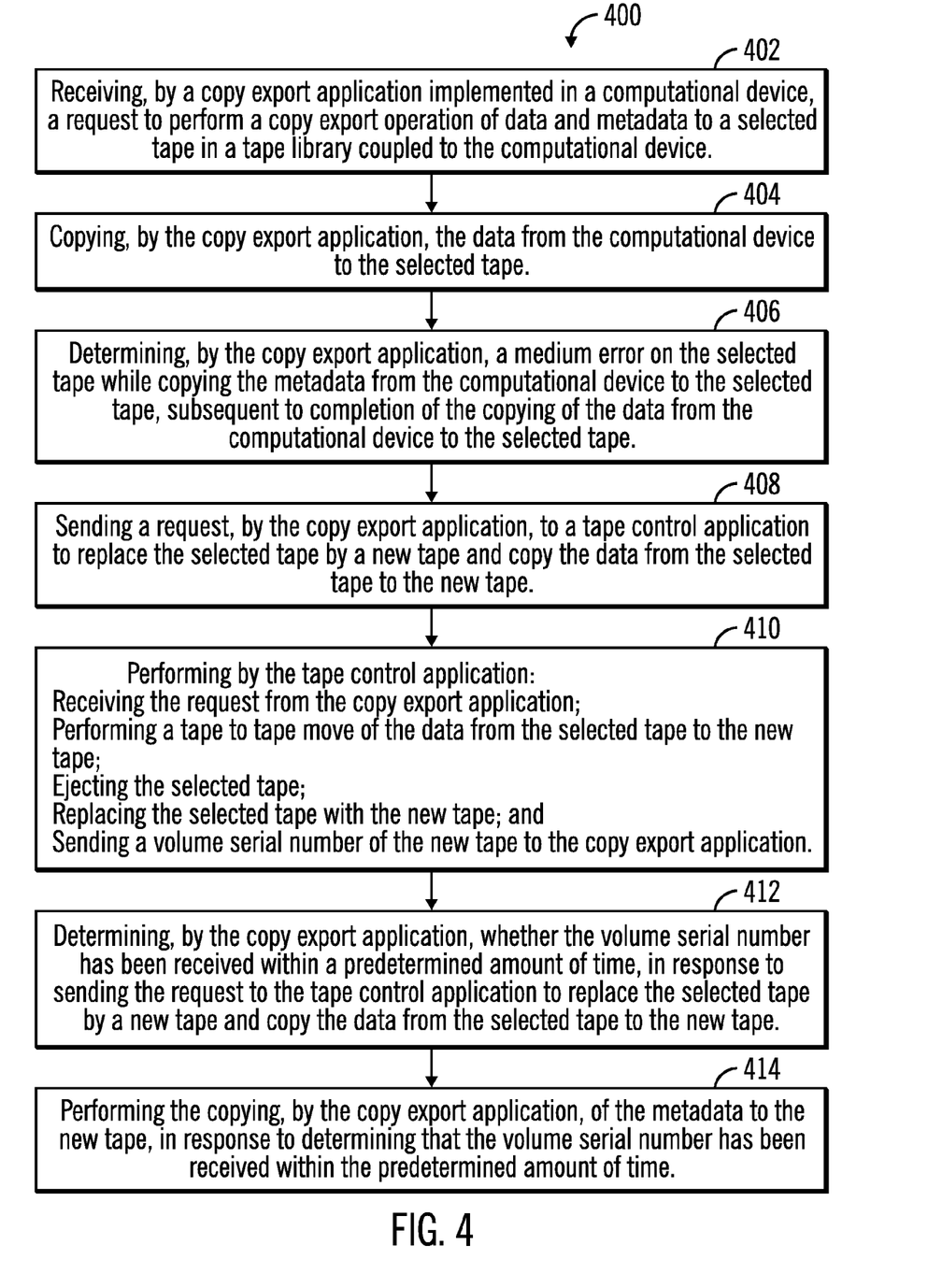
FIG. 4 illustrates a flowchart that shows third operations implemented in the computing environment of FIG. 1, in accordance with certain embodiments.

FIG. 4 illustrates a flowchart that shows third operations 400 implemented in the computing environment 100 of FIG. 1, in accordance with certain embodiments.

Control starts at block 402 in which a copy export application 108 implemented in a computational device 102 receives a request to perform a copy export operation of data 112 and metadata 114 to a selected tape 106 in a tape library 104 coupled to the computational device 102. The copy export application 108 copies (at block 404) the data 112 from the computational device 102 to the selected tape 106. The copy export application 108 determines (at block 406) a medium error on the selected tape 106 while copying the metadata 114 from the computational device 102 to the selected tape 106, subsequent to completion of the copying of the data 112 from the computational device 102 to the selected tape 106. The copy export application 108 then sends (at block 406) a request to a tape control application 110 to replace the selected tape 106 by a new tape and copy the data from the selected tape 106 to the new tape.

A tape control application 110 implemented in the computational device 102 receives (at block 410) the request from the copy export application 108, and performs (also at block 410) a tape to tape move of the data from the selected tape 106 to the new tape. The tape control application ejects (also at block 410) the selected tape 106, replaces (also at block 410) the selected tape 106 with the new tape, and sends (also at block 410) a volume serial number of the new tape to the copy export application 108.

The copy export application 108 determines (at block 412) whether the volume serial number has been received within a predetermined amount of time, in response to sending the request to the tape control application 110 to replace the selected tape 106 by a new tape and copy the data from the selected tape to the new tape. The copy export application 110 then performs (at block 414) the copying of the metadata 114 to the new tape, in response to determining that the volume serial number has been received within the predetermined amount of time.

In certain embodiments shown in FIGS. 1-4, the recovery for medium error is automated and does not require customer or field support to manually invoke a recovery. The automated recovery can be done in the same copy export operation in response to a failure, such that customers may export data on schedule. There is no need to run copy export operations once again to export the data and metadata that caused a failure while copying to a selected tape that was substituted by a new tape. During the recovery, customer data on the failed tape is copied to a new tape directly through tape to tape data copy, without being recalled back into the cache of the computational device and having to wait later to be migrated to a new tape from the cache. The degraded or bad tape may be automatically ejected at the end of recovery and a notification may be sent to the customer so that the selected tape is not used for copy export any more.

The above embodiments may not only be implemented for computational device copy export medium error recovery but also may be applied to any application that requires appending metadata on a sequentially accessed storage medium. For example, writing deduplicated data on a tape may require the writing of some metadata on the tape. The metadata is not necessarily restricted to a database. The metadata may be any metadata that is required for using customer data on the storage medium. The medium error during metadata writing is not necessarily restricted to the medium capacity degradation. It can be any error caused by medium related errors.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
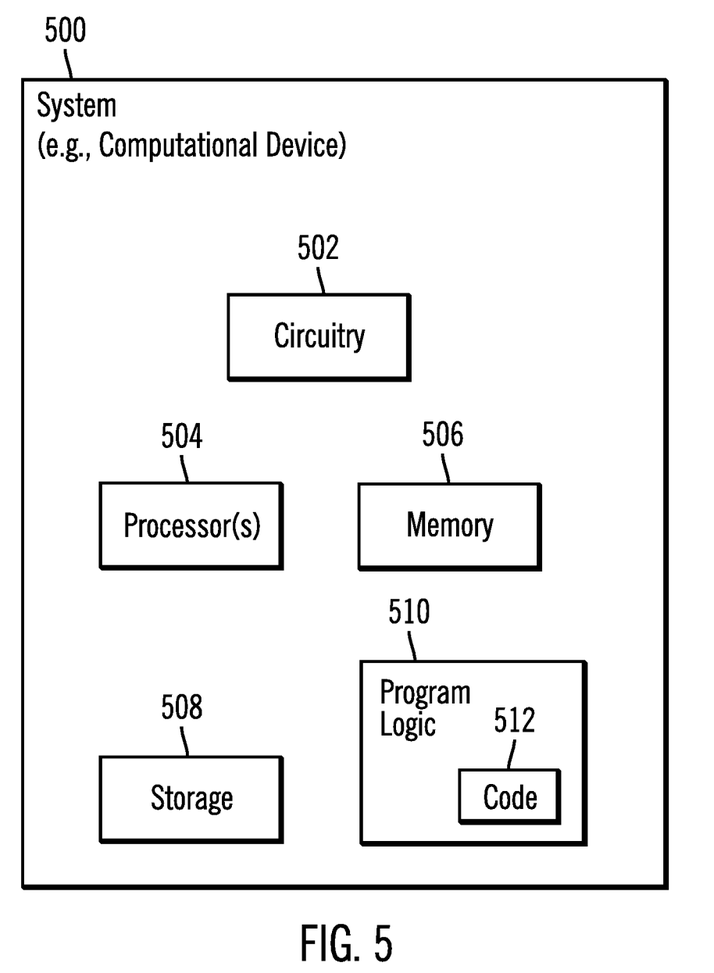
FIG. 5 illustrates a block diagram of a computational system that shows certain elements that may be included in the computational device of FIG. 1, in accordance with certain embodiments.

FIG. 5 illustrates a block diagram that shows certain elements that may be included in the system 500 in accordance with certain embodiments. The system 500 may comprise the computational device 102 and may include a circuitry 502 that may in certain embodiments include at least a processor 504. The system 500 may also include a memory 506 (e.g., a volatile memory device), and storage 508. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   determining a medium error on a tape while copying metadata to the tape, subsequent to completion of copying of data to the tape;
   sending a request to replace the tape by a new tape and copy the data from the tape to the new tape; and
   copying the metadata to the new tape.

2. The method of claim 1, the method further comprising performing by a tape control application implemented in a computational device:
   receiving the request from a copy export application;
   performing a tape to tape move of the data from the tape to the new tape;
   ejecting the tape;
   replacing the tape with the new tape; and
   sending a volume serial number of the new tape to the copy export application.

3. The method of claim 2, the method further comprising:
   determining, by the copy export application, whether the volume serial number has been received within a predetermined amount of time, in response to sending a request to the tape control application to replace the tape by a new tape and copy the data from the tape to the new tape; and
   performing the copying, by the copy export application, of the metadata to the new tape, in response to determining that the volume serial number has been received within the predetermined amount of time.

4. The method of claim 3, the method further comprising:
   indicating, by the copy export application, a failure of the copy export operation, in response to determining that the volume serial number has not been received within the predetermined amount of time.

5. The method of claim 1, wherein:
   the data is customer data, wherein customer data is data that is specifically reserved to be used by a customer;
   the metadata is a database to manage the customer data; and
   a copy export operation is successful only in response to both the customer data and the database being transferred from a computational device to a single tape.

6. A system, comprising:
   a memory; and
   a processor coupled to the memory, wherein the processor performs operations, the operations comprising:
   determining a medium error on a tape while copying metadata to the tape, subsequent to completion of copying of data to the tape;
   sending a request to replace the tape by a new tape and copy the data from the tape to the new tape; and
   copying the metadata to the new tape.

7. The system of claim 6, the operations further comprising performing by a tape control application:
   receiving the request from a copy export application;
   performing a tape to tape move of the data from the tape to the new tape;
   ejecting the tape;
   replacing the tape with the new tape; and
   sending a volume serial number of the new tape to the copy export application.

8. The system of claim 7, the operations further comprising:
   determining, by the copy export application, whether the volume serial number has been received within a predetermined amount of time, in response to sending a request to the tape control application to replace the tape by a new tape and copy the data from the tape to the new tape; and
   performing the copying, by the copy export application, of the metadata to the new tape, in response to determining that the volume serial number has been received within the predetermined amount of time.

9. The system of claim 8, the operations further comprising:
   indicating, by the copy export application, a failure of the copy export operation, in response to determining that the volume serial number has not been received within the predetermined amount of time.

10. The system of claim 6, wherein:
    the data is customer data, wherein customer data is data that is specifically reserved to be used by a customer;
    the metadata is a database to manage the customer data; and
    a copy export operation is successful only in response to both the customer data and the database being transferred from a computational device to a single tape.

11. A computer program product, the computer program product comprising:
    a non-transitory computer readable storage medium having computer readable program code embodied therewith, the computer readable program code configured to perform operations, the operations comprising:

determining a medium error on a tape while copying metadata to the tape, subsequent to completion of copying of data to the tape;

sending a request to replace the tape by a new tape and copy the data from the tape to the new tape; and copying the metadata to the new tape.

12. The computer program product of claim 11, the operations further comprising performing by a tape control application implemented in a computational device:

receiving the request from a copy export application;

performing a tape to tape move of the data from the tape to the new tape;

ejecting the tape;

replacing the tape with the new tape; and sending a volume serial number of the new tape to the copy export application.

13. The computer program product of claim 12, the operations further comprising:

determining, by the copy export application, whether the volume serial number has been received within a predetermined amount of time, in response to sending a request to the tape control application to replace the tape by a new tape and copy the data from the tape to the new tape; and performing the copying, by the copy export application, of the metadata to the new tape, in response to determining that the volume serial number has been received within the predetermined amount of time.

14. The computer program product of claim 13, the operations further comprising:

indicating, by the copy export application, a failure of the copy export operation, in response to determining that the volume serial number has not been received within the predetermined amount of time.

15. The computer program product of claim 11, wherein:

the data is customer data, wherein customer data is data that is specifically reserved to be used by a customer;

the metadata is a database to manage the customer data; and a copy export operation is successful only in response to both the customer data and the database being transferred from a computational device to a single tape.

16. A method for deploying computing infrastructure, comprising integrating computer-readable code into a computational device, wherein the code in combination with the computational device performs operations, the operations comprising:

determining a medium error on a tape while copying metadata to the tape, subsequent to completion of copying of data to the tape;

sending a request to replace the tape by a new tape and copy the data from the tape to the new tape; and copying the metadata to the new tape.

17. The method for deploying computing infrastructure of claim 16, the operations further comprising performing by a tape control application implemented in a computational device:

receiving the request from a copy export application;

performing a tape to tape move of the data from the tape to the new tape;

ejecting the tape;

replacing the tape with the new tape; and sending a volume serial number of the new tape to the copy export application.

18. The method for deploying computing infrastructure of claim 17, the operations further comprising:

determining, by the copy export application, whether the volume serial number has been received within a predetermined amount of time, in response to sending a request to the tape control application to replace the tape by a new tape and copy the data from the tape to the new tape; and performing the copying, by the copy export application, of the metadata to the new tape, in response to determining that the volume serial number has been received within the predetermined amount of time.

19. The method for deploying computing infrastructure of claim 18, the operations further comprising:

indicating, by the copy export application, a failure of the copy export operation, in response to determining that the volume serial number has not been received within the predetermined amount of time.

20. The method for deploying computing infrastructure of claim 16, wherein:

the data is customer data, wherein customer data is data that is specifically reserved to be used by a customer;

the metadata is a database to manage the customer data; and a copy export operation is successful only in response to both the customer data and the database being transferred from a computational device to a single tape.

* * * * *